US012789257B2

(12) United States Patent
Fu et al.

(10) Patent No.: US 12,789,257 B2
(45) Date of Patent: Nov. 10, 2026

(54) METHOD FOR PROCESSING A PART USING A FORMING DEVICE BY LASER MELTING

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Xin Fu, Shanghai (CN); Liming Lei, Shanghai (CN); Jun Fu, Shanghai (CN); Lei Shi, Shanghai (CN); Zongge Jiao, Shanghai (CN); Yue Wang, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(*) Notice: Subject to any disclaimer, the term of this patent is extended or adjusted under 35 U.S.C. 154(b) by 397 days.

(21) Appl. No.: 18/566,252

(22) PCT Filed: Apr. 1, 2022

(86) PCT No.: PCT/CN2022/084933
§ 371 (c)(1),
(2) Date: Dec. 1, 2023

(87) PCT Pub. No.: WO2022/252798
PCT Pub. Date: Dec. 8, 2022

(65) Prior Publication Data
US 2024/0246149 A1 Jul. 25, 2024

(30) Foreign Application Priority Data
Jun. 3, 2021 (CN) ......................... 202110616613.8

(51) Int. Cl.
*B22F 10/366* (2021.01)
*B22F 10/28* (2021.01)
(Continued)

(52) U.S. Cl.
CPC ............ *B22F 10/366* (2021.01); *B22F 10/28* (2021.01); *B22F 10/31* (2021.01); *B22F 10/85* (2021.01);
(Continued)

(58) Field of Classification Search
CPC ................... B23K 15/086; B28B 1/001; B22F 2003/1057
See application file for complete search history.

(56) References Cited

U.S. PATENT DOCUMENTS

2020/0215760 A1* 7/2020 Wijn ..................... B29C 64/268

FOREIGN PATENT DOCUMENTS

CN 101590571 A 12/2009
CN 104923784 A 9/2015
(Continued)

OTHER PUBLICATIONS

International Search Report issued on Jun. 27, 2022, in corresponding International Patent Application No. PCT/CN2022/084933, 8 pages.

*Primary Examiner* — Nicholas A Wang
(74) *Attorney, Agent, or Firm* — McCoy Russell LLP

(57) ABSTRACT

A method for processing a part using a forming device by laser melting, by: establishing a function, performing first-order and second-order differentiation on the function to obtain a first-order and a second-order derivative, solving the equation that the first-order derivative equals to zero, substituting the roots into the second-order derivative to obtain the roots of the first-order derivative, among which the root with a smallest absolute value is defined as a first value; performing third-order differentiation on the obtained
(Continued)

function, solving the equation that the second-order derivative equals to zero to obtain the roots which is defined as second values; subtracting the first value from the second values, and obtaining the second value corresponding to a value that is less than zero and has a smallest absolute value among obtained results, that is a value of the defocus amount to achieve the optimal self-healing effect.

10 Claims, 4 Drawing Sheets

(51) Int. Cl.
*B22F 10/31* (2021.01)
*B22F 10/85* (2021.01)
*B33Y 10/00* (2015.01)
*B33Y 50/02* (2015.01)

(52) U.S. Cl.
CPC ............... *B33Y 10/00* (2014.12); *B33Y 50/02* (2014.12); *B22F 2998/10* (2013.01)

(56) References Cited

FOREIGN PATENT DOCUMENTS

| | | | |
|---|---|---|---|
| CN | 106424726 | A | 2/2017 |
| CN | 109487267 | A | 3/2019 |
| CN | 110904405 | A | 3/2020 |
| CN | 110976849 | A | 4/2020 |
| CN | 113059188 | A | 7/2021 |
| JP | 2011092953 | A | 5/2011 |
| JP | 2019178368 | A | 10/2019 |

* cited by examiner

METHOD FOR PROCESSING A PART USING A FORMING DEVICE BY LASER MELTING

CROSS REFERENCE TO RELATED APPLICATIONS

This application claims the priority of China Patent Application No. 202110616613.8 filed on Jun. 3, 2021. This application refers to the full text of the above-mentioned China patent application.

TECHNICAL FIELD

The invention relates to a method for processing a part using a forming device by laser melting.

As one of the typical metal additive processing technologies, laser melting deposition technique is based on the principle of "dispersion+accumulation", where the three-dimensional model of the part is sliced and scattered into two-dimensional information for planning the path of motion, a molten pool is formed on the substrate with laser as the heat source, combined with synchronous powder conveying, the powder can be melted and solidified rapidly in the molten pool, completing the formation of a three-dimensional solid part by layer-by-layer deposition. This technique has the characteristics of high flexibility, short cycle, high performance and nearly net formation without a die, which is widely used in the aspects of formation of large-size metal components and repair of high-value parts in aerospace.

In the forming/repairing process of the part by laser melting deposition, due to the influence of the processing technique and the structure of the part, the surface of parts is likely prone to uneven defects, and in some severe situation, the forming/repairing process of the part cannot continue.

In the prior art, Zhang et al. CN101590571A states that there is a "self-healing effect" in the process of laser melting deposition, and explains the principle of the self-healing effect of laser melting deposition, pointing out that when the processing surface is under the condition of negative defocus, the surface fluctuation will decrease gradually with the increase of the number of deposition layers, and finally a flat surface will be obtained, restoring from an unstable state to a stable state by the adjustment of the technique itself without human intervention during the process. Although Zhang recommends to process the parts using negative defocusing technique, there is no further explanation on how to obtain the parameters of the optimal defocusing amount of self-healing in the laser melting deposition process.

SUMMARY

The technical problem to be solved by the invention is to overcome the problem that the parameters of the defocusing amount cannot be determined in the process of processing parts by laser melting deposition technique in the prior art, resulting that the optimal self-healing effect cannot be achieved by the processed parts. The present invention provides a method for processing a part using a forming device by laser melting.

The present invention solves the above technical problem through the following technical solution:

The present invention provides the method for processing the part using the forming device by laser melting, wherein comprising the following steps:

S1, under the condition that other process parameters of the forming device by laser melting are the same, performing single pass experiments with setting different defocus amounts, and measuring a height of the single pass generated corresponding to different defocus amounts:

S2, taking the defocus amount as an independent variable and the height of the single pass as a dependent variable, establishing a function between the height of the single pass and the defocus amount, wherein the function is a polynomial function with a degree of at least four:

S3, performing first-order differentiation and second-order differentiation on the obtained function to obtain a first-order derivative and a second-order derivative, solving the equation that the first-order derivative equals to zero to obtain different roots, substituting values of the different roots into the second-order derivative to obtain the values of the roots of the first-order derivative corresponding to values of the second-order derivative that is less than zero, among which the value of the root with a smallest absolute value is defined as a first value;

S4, performing third-order differentiation on the obtained function to obtain a third-order derivative, solving the equation that the second-order derivative equals to zero to obtain different roots, substituting values of the different roots into the third derivative to obtain the values of the roots of the second-order derivative corresponding to values of the third derivative that is less than zero, which is defined as second values;

S5, subtracting the first value from the second values, and obtaining the second value corresponding to a value that is less than zero and has a smallest absolute value among obtained results, that is a value of the defocus amount to achieve the optimal self-healing effect;

S6, acquiring a focusing point of the forming device by laser melting, where the focusing point is a point where a laser beam emitted and powder ejected by a laser cladding head of the forming device by laser melting are converged, adjusting an initial distance between the focusing point and a substrate for forming the part based on the value of the defocus amount obtained in step S5;

S7, substituting the value of the defocus amount obtained in step S5 into the function in step S2 to obtain a corresponding height value of the single pass, and setting a relative displacement between the laser cladding head and the substrate for forming the part according to the height value of the single pass obtained, so as to keep a distance between the focusing point and an attaching surface of the powder ejected by the laser cladding head unchanged.

In an embodiment, a functional relationship between the different defocus amounts and the height of the single pass can be obtained by defining other process parameters, so that optimal parameters of the defocus amount can be quickly obtained, and the rapid self-healing of local fluctuation on the surface of the parts in the laser melting deposition forming/repairing process can be realized, which improves the consistency of the processing layer thickness of the parts and contributes to obtain uniform structure and performance.

Preferably, in step S1, the selection of the different defocus amount covers negative defocus, zero defocus and negative defocus.

In an embodiment, the values of the parameters of the defocus amount can be selected from negative defocus, zero defocus and negative defocus, which allows the diversity of data, so that the function obtained can be more accurate, ensuring the accuracy of the obtained optimal parameters of the defocus amount.

Preferably, in step S1, the height of the single pass under the condition of different defocus amounts is measure by metallographic method.

In an embodiment, using metallographic method to measure the height of the single pass, the height of the single pass obtained would be more accurate, ensuring the accuracy of the optimal parameters of the defocus amount obtained later.

Preferably, in step S1, a temperature of the substrate in each single pass experiment is the same as that of the substrate in a previous single pass experiment.

In an embodiment, this can avoid the interference of the temperature generated by the previous single pass experiment to the next single pass experiment, and reduce the influence of heat accumulation of the substrate on the geometry of the single pass.

Preferably, in step S1, at least 5 groups of parameters of the defocus amount are selected.

In an embodiment, using multiple groups of parameters improves the reliability of the experiment.

Preferably, in step S1, when carrying out the single pass experiments under the condition of different defocus amounts, other process parameters such as a laser power, a laser scanning speed, a spot diameter, a powder feeding rate, a powder-carrying gas flow rate and a lens-protecting gas flow rate remain constant under the condition of different defocus amounts.

Preferably, in step S1, the laser power is 2800 W, the laser scanning speed is 1000 mm/min, the spot diameter is 5 mm, the powder feeding rate is 28 g/min, the powder-carrying gas flow rate is 8 L/min, and the lens-protecting gas flow rate is 20 L/min when carrying out the single pass experiments under the condition of different defocus amounts.

Preferably, in step S2, a functional relationship between the height of the single pass and the defocus amount is a quartic function.

In an embodiment, using the quartic functional relationship, the workload can be reduced and the work efficiency can be improved on the premise of obtaining more accurate parameters of the defocus amount.

Preferably, in step S2, a functional relationship between the height of the single pass and the defocus amount is established by polynomial fitting.

In an embodiment, the functional relationship can be established by polynomial fitting using auxiliary tools, which is simple and convenient, reducing the workload of experimenters.

Preferably, a correlation coefficient is not less than 0.995 when polynomial fitting is carried out.

In an embodiment, when polynomial fitting is carried out, the correlation coefficient is not less than 0.995, ensuring the accuracy of the obtained function, so that the obtained optimal parameters of the defocus amount can be more accurate.

Definition of the Term

Defocusing amount: the offset distance of the processing surface of the part relative to the focusing point of laser (or powder) during the forming/repairing process of the part by laser melting deposition, where zero defocus is the defocus at the focusing point, positive defocus is the defocus in the direction away from the laser cladding head from the focusing point, negative defocus is the defocus in the direction close to the laser cladding head from the focusing point. On the basis of the common sense in the field, the preferred embodiment of the present invention can be obtained by any combination of the preferred condition mentioned above.

The positive effect of the invention is that: in the present invention, the functional relationship between the different defocus amounts and the height of the single pass can be obtained by defining other process parameters, so that the optimal parameters of the defocus amount can be quickly obtained, and the rapid self-healing of local fluctuation on the surface of the parts in the laser melting deposition forming/repairing process can be realized, which improves the consistency of the processing layer thickness of the parts and contributes to obtain uniform structure and performance.

Figure 1:
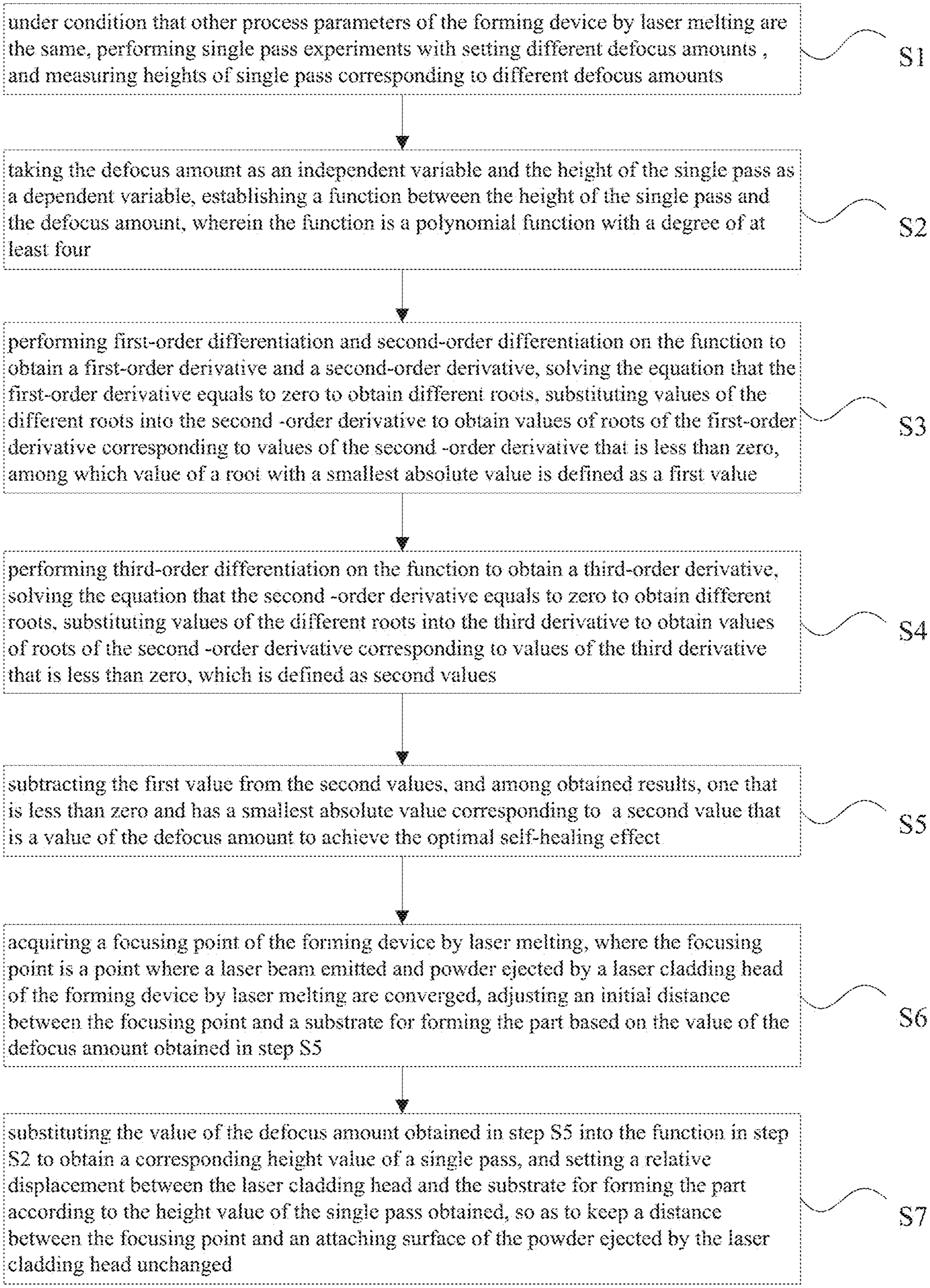
FIG. 1 is a flow chart of the method for processing the part using the forming device by laser melting according to an embodiment of the present invention.

Description of reference numerals: substrate 1; laser cladding head 2; laser 3; powder 4: focusing point 5: single pass 6.

DETAILED DESCRIPTION

The present invention will be explained more clearly and completely with respect to the embodiments and the accompanying drawings, but the invention is not limited to the scope of the embodiments.

As shown in FIG. 1, a method for processing a part using a forming device by laser melting disclosed in the embodiment comprises the following steps:

S1, under condition that other process parameters of the forming device by laser melting are kept constant, performing single-pass experiments with setting different defocus amounts, and measuring a height of each single pass generated corresponding to different defocus amounts;

S2, taking the defocus amount as an independent variable and the height of the single pass as a dependent variable, establishing a function between the height of the single pass and the defocus amount, wherein is a polynomial function with a degree of at least four;

S3, performing first-order differentiation and second-order differentiation on the obtained function to obtain a first-order derivative and a second-order derivative, solving the equation where the first-order derivative equals to zero to obtain different roots, substituting values of the different roots into the second-order derivative to obtain the roots of the first-order derivative corresponding to values of the second-order derivative that is less than zero, among which the value of the root with a smallest absolute value is defined as a first value;

S4, performing third-order differentiation on the obtained function to obtain a third-order derivative, solving the equation where the second-order derivative equals to zero to obtain different roots, substituting values of the different roots into the third derivative to obtain the roots of the second-order derivative corresponding to values of the third derivative that is less than zero, which is defined as second values;

S5, subtracting the first value from the second values, wherein the second value corresponding to a negative result with the smallest absolute value is a defocus amount value to be used;

S6, acquiring a focusing point of the forming device by laser melting, where the focusing point is a point where a laser beam emitted and powder ejected by a laser cladding head of the forming device by laser melting are converged, adjusting an initial distance between the focusing point and a substrate for forming the part such that the initial distance is equal to the defocus amount obtained in step S5 and the defocus amount is negative defocus;

S7, substituting the value of the defocus amount obtained in step S5 into the function in step S2 to obtain a corresponding height value of the single pass, and setting a relative displacement between the laser cladding head and the substrate for forming the part according to the height value of the single pass obtained, so as to keep a distance between the focusing point and an deposition surface of the powder ejected by the laser cladding head unchanged.

In this embodiment, with the above method for processing parts using the forming device by laser melting, a functional relationship between the different defocus amounts and the height of the single pass can be obtained by defining other process parameters, so that optimal parameters of the defocus amount can be quickly obtained, and the rapid self-healing of local fluctuation on the surface of the parts in the laser melting deposition forming/repairing process can be realized, which improves the consistency of the processing layer thickness of the parts and contributes to obtain uniform structure and performance.

Figure 2:
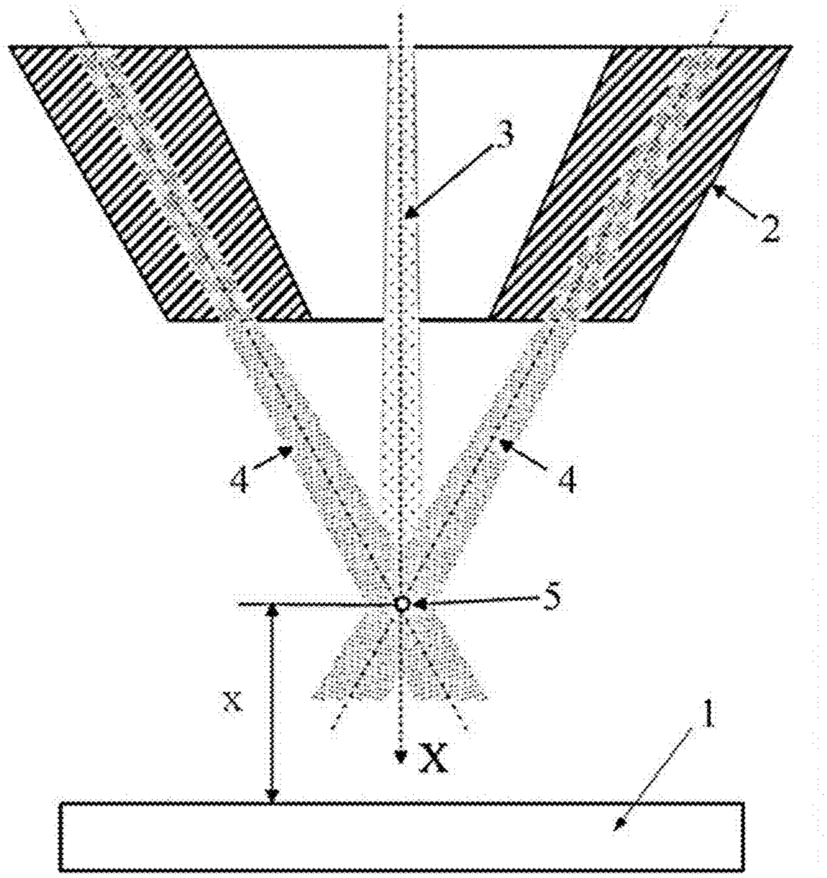
FIG. 2 is a schematic diagram of the defocus amount during the laser melting deposition single pass experiment according to a preferred embodiment of the present invention.

The definition of the defocus amount is shown in FIG. 2, zero defocus is the defocus at the focusing point 5 of the laser 3 and the powder 4, positive defocus is the defocus in the direction away from the laser cladding head 2 from the focusing point 5, negative defocus is the defocus in the direction close to the laser cladding head 2 from the focusing point 5. The values of the parameters of the defocus amount can be selected from negative defocus, zero defocus and negative defocus, which allows the diversity of data, so that the function obtained can be more accurate, ensuring the accuracy of the obtained optimal parameters of the defocus amount.

In this embodiment, in step S1, the values of the parameters of the defocus amount can be selected from negative defocus, zero defocus and negative defocus. When carrying out the single pass experiments under the condition of different defocus amounts, the experiment is carried out using the single variable method, where the single pass experiments under the condition of different defocus amounts is carried out when the other process parameters such as a laser power, a laser scanning speed, a spot diameter, a powder feeding rate, a powder-carrying gas flow rate and a lens-protecting gas flow rate remain constant.

In this embodiment, the laser power is set to be 2800 W, the laser scanning speed is set to be 1000 mm/min, the spot diameter is set to be 5 mm, the powder feeding rate is set to be 28 g/min, the powder-carrying gas flow rate is set to be 8 L/min, and the lens-protecting gas flow rate is set to be 20 L/min when carrying out the single pass experiments under the condition of different defocus amounts.

The defocus amount x increases from −9 mm to 9 mm with an increment of 3 mm, and 7 groups of laser melting deposition single pass experiments have been carried out. Surely, the number of groups of experiments can be increased and the increment of defocus amount can be reduced to make the results of the single pass experiment more reliable and accurate.

In each single pass experiment, it is necessary to ensure that the temperature of the substrate is the same as that of the substrate in a previous single pass experiment, avoiding the interference of the temperature generated by the previous single pass experiment to the next single pass experiment, and reducing the influence of heat accumulation of the substrate on the geometry of the single pass. Therefore, it is necessary to keep argon scouring on the substrate for cooling for more than 5 minutes when each single pass scanning is completed, ensuring that the substrate is cooled to room temperature before the next single pass scanning.

Figure 3:
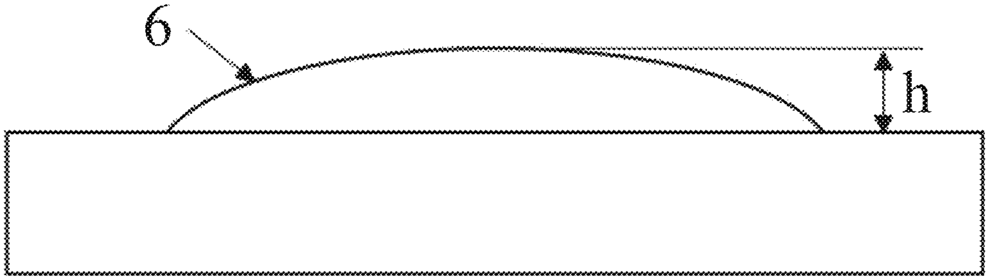
FIG. 3 is a schematic diagram of measuring the height of the single pass during the laser melting deposition single pass experiment according to the preferred embodiment of the present invention.

As shown in FIG. 3, it is preferred to use metallographic method to measure the height h of the single pass 6 under the condition of different defocus amounts. Using metallographic method to measure the height of the single pass 6, the height of the single pass 6 obtained would be more accurate, ensuring the accuracy of the optimal parameters of the defocus amount obtained later.

In this embodiment, the corresponding relationship between the height h of the single pass 6 and the defocus amount x under the condition of different defocus amounts is shown in Table 1 below:

TABLE 1 corresponding relationship between the height h of the single pass and the defocus amount x

| defocus amount, x (mm) | −9 | −6 | −3 | 0 | 3 | 6 | 9 |
|---|---|---|---|---|---|---|---|
| height of single pass, h (μm) | 192.6 | 253.8 | 330.9 | 373.7 | 341.5 | 250.6 | 192.6 |

In this embodiment, polynomial fitting can be performed by Excel, origin and other tools, and the functional relationship can be established by polynomial fitting using auxiliary tools, which is simple and convenient, reducing the workload of experimenters. The fitted polynomial is a quartic function. Using the quartic functional relationship, the workload can be reduced and the work efficiency can be improved on the premise of obtaining more accurate parameters of the defocus amount. When polynomial fitting is carried out, it is necessary to make sure that a correlation coefficient is not less than 0.995 to ensure the accuracy of the obtained function, so that the obtained optimal parameters of the defocus amount can be more accurate.

In this embodiment, the defocus amount x is taken as an independent variable and the height h of the single pass is taken as a dependent variable, and the functional relationship between the height h of the single pass and the defocus amount x is established as h=f(x). Based on the data obtained above, the functional relationship between the height h of the single pass and the defocus amount x in this embodiment can be obtained by the polynomial fitting method, that is $f(x)=0.0252\ x^4-0.0076x^3-4.2708x^2+0.5296x+373.07$. After calculation, the correlation coefficient $R^2=0.9984>0.995$, which indicates a good correlation between the height h of the single pass and the defocus amount x.

In other embodiments, other auxiliary tools can be used for polynomial fitting, and the fitted polynomial can be a quintic function, a sextic function, but at least a quartic function.

After obtaining the functional relationship f(x) between the height h of the single pass and the defocus amount x, first-order differentiation and second-order differentiation are performed on the obtained function f(x) to obtain the first-order derivative f(x) and the second-order derivative f''(x), the equation that the first-order derivative f(x) equals to zero is solved to obtain the different roots, the values of the different roots are substituted into the second-order derivative f''(x) to obtain the values of the roots of the first-order derivative f(x) corresponding to values of the second-order derivative that is less than zero, among which the value of the root with the smallest absolute value is defined as the first value.

The first value can also be the value of the defocus amount corresponding to the largest height of the single pass that can be actually obtained.

In this embodiment, $f'(x)=0.1008x^3-0.0228x^2-8.5416x+0.5296$ and $f''(x)=0.3024x^2-0.0456x-8.5416$ are obtained by performing first-order differentiation and second-order differentiation on the function f(x).

When f(x)=0, the roots are $x_{11}=-9.1$, $x_{12}=0.06$ and $x_{13}=9.3$ respectively, and the values of $f''(x_{11})$, $f''(x_{12})$ and $f''(x_{13})$ are obtained by substituting $x_{11}=-9.1$, $x_{12}=0.06$ and $x_{13}=9.3$ into f''(x). Comparing the values of $f''(x_{11})$, $f''(x_{12})$ and $f''(x_{13})$ with 0, only the value of $f''(x_{12})$ is less than zero, the value of the root of the first-order derivative f(x) corresponding to $f''(x_{12})$ is $x_{12}=0.06$. So the value of the defocus amount corresponding to the largest height of the single pass is 0.06, that is, when the value of the defocus amount is 0.06, the height h of the single pass reaches the largest value of 373 μm. In this embodiment, the self-healing effect of local fluctuation on the surface of the parts in the laser melting deposition forming/repairing process can be realized when the defocus amount is 0.06, that is, the range of the defocus amount is $x \in [-\infty, 0.06]$.

Then, third-order differentiation is performed on the obtained function f(x) to obtain the third-order derivative f'''(x), $f'''(x)=0.6048x-0.0456$. The equation that the second-order derivative f''(x) equals to zero is solved to obtain the different roots, the values of the different roots are substituted into the third order derivative f''(x) to obtain the values of the roots of the second-order derivative f''(x) corresponding to values of the third derivative that is less than zero, among which the value of the root with the smallest absolute value is defined as the second value. The obtained maximum value of the first-order derivative of the function is the value of the root of the second-order derivative f''(x) corresponding to the value of the third order derivative that is less than zero. Subtracting the first value from the second values, the second value corresponding to the value that is less than zero and has the smallest absolute value among obtained results can be obtained, that is the value of the defocus amount to achieve the optimal self-healing effect.

That is, under the condition of negative defocus of the powder, the optimal self-healing effect can be achieved by using the defocus amount at a maximum slope of the function f(x). Under the condition of negative defocus of the powder, the height of the single pass at the maximum slope of the curve is most sensitive to the change of the defocus amount, so small protrusions or depressions appeared on a local surface of the part during processing can be self-healed at a highest speed during the subsequent deposition process, thereby a flat surface can be obtained.

In this embodiment, the roots of f''(x)=0 are $x_{21}=-5.2$ and $x_{22}=5.4$ respectively, the values of $f''(x_{21})$ and $f'''(x_{22})$ are obtained by substituting $x_{21}=-5.2$ and $x_{22}=5.4$ into the third derivative f''(x). Comparing the values of $f'''(x_{21})$ and $f'''(x_{22})$ with 0, the value of the root of the second-order derivative f''(x) corresponding to the value that is less than zero among $f'''(x_{21})$ and $f''(x_{22})$ is defined as the second value.

Figure 4:
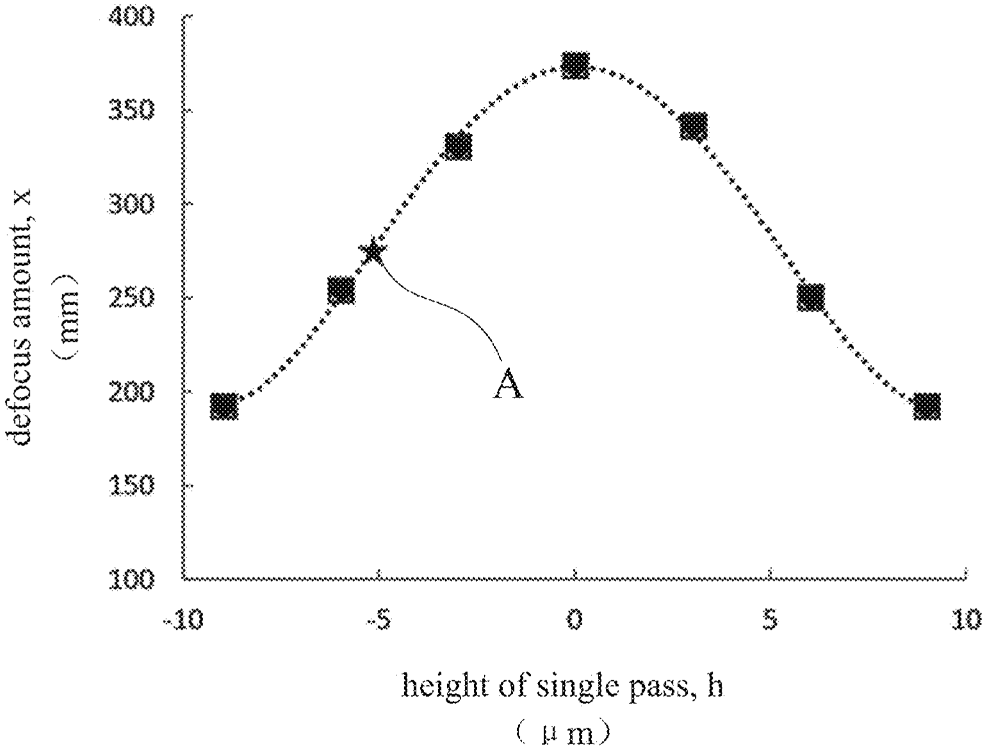
FIG. 4 is a functional relationship between the defocus amount and the height of the single pass according to the preferred embodiment of the present invention.

In this embodiment, only the value of $f'''(x_{21})$ is less than zero, so −5.2 is the only second value. Moreover, $-5.2-0.06=-5.26<0$, so the optimal self-healing effect can be achieved when the defocus amount is −5.2 mm. As shown in FIG. 4, when x=−5.2, a point A is under the condition of negative defocus of the powder and is at the maximum slope of the curve, so the optimal self-healing effect of laser melting deposition can be achieved.

In this embodiment, after the value of the defocus amount is obtained, the forming device by laser melting is set up and operated to process the required parts. When setting the forming device by laser melting, the focusing point of the forming device by laser melting is acquired, where the focusing point is the point where the laser beam emitted and the powder ejected by the laser cladding head of the forming device by laser melting are converged, and then the initial distance between the focusing point and the substrate for forming the part is adjusted based on the value of the defocus amount obtained.

Referring to FIG. 2, if the value of the defocus amount is positive, the substrate 1 for forming the part is provided on a side of the focusing point 5 that is away from the laser cladding head 2 (FIG. 2 shows the case where the value of the defocus amount is positive); if the value of the defocus amount is negative, the substrate 1 for forming the part is provided on a side of the focusing point 5 that is close to the laser cladding head 2: if the value of the defocus amount is zero, a forming surface of the substrate 1 for forming the part is provided in a plane where the focusing point 5 is located.

In this embodiment, the value of the defocus amount is −5.2 mm, which means that the substrate 1 is provided on the side of the focusing point 5 that is close to the laser cladding head 2, and a distance between the forming surface of the substrate 1 and the focusing point is 5.2 mm.

After adjusting the position of the substrate 1, the value of the defocus amount obtained in step S5 is substituted into the function in step S2 to obtain the corresponding height value of the single pass. The relative displacement between the laser cladding head 2 and the substrate 1 are set according to the height value of the single pass obtained, so as to keep the distance between the focusing point 5 and the deposition surface of the powder 4 ejected by the laser cladding head 2 unchanged.

The reason why the laser cladding head 2 and the substrate 1 would be displaced relative to each other when processing the part is that the part would have a certain height during the forming process. If the distance between the substrate 1 and the focusing point 5 was not adjusted, the distance between the deposition surface of the powder ejected later and the focusing point 5 will become closer and closer, thereby affecting the optimal self-healing effect of laser melting deposition of the part.

The relative displacement between the laser cladding head 2 and the substrate 1 can be achieved by moving the laser cladding head 2 separately or moving the substrate 1 separately, and can also be achieved by moving the laser cladding head 2 and the substrate 1 at the same time.

For example, in this embodiment, an I-shaped TC4 alloy part is formed by laser melting deposition, the height h of the single pass corresponding to the defocus amount x=−5.2 mm is h=274.33μ m, so the laser cladding head 2 moves 274.33μ m in the direction away from the substrate 1 after each time the single pass is formed when processing the I-shaped TC4 alloy part.

Figure 6:
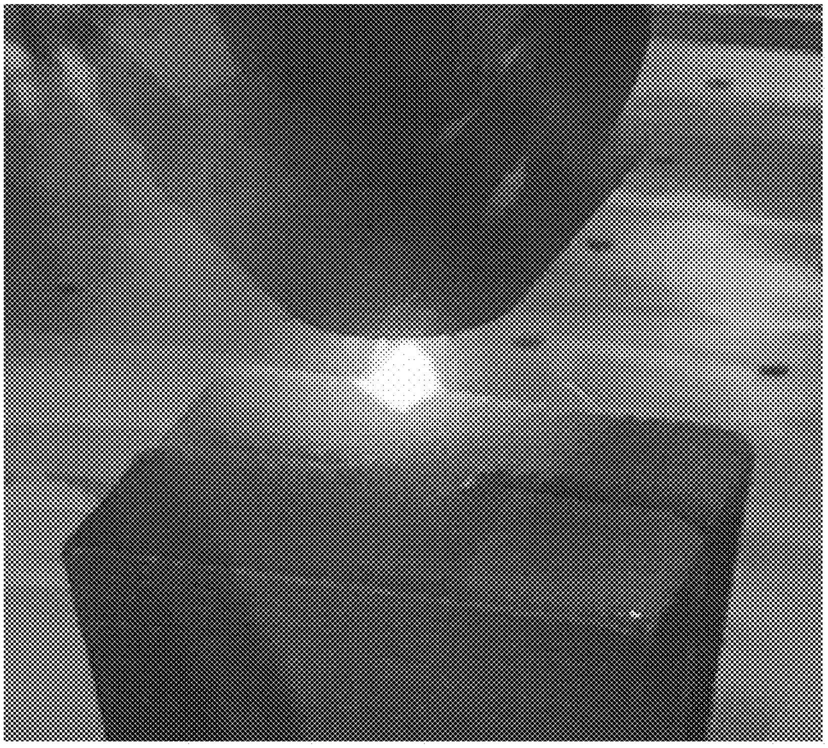
FIG. 6 is a schematic diagram of the surface of the I-shaped TC4 alloy part after forming by laser melting deposition, with the defocus amount $x=-5.2$ mm calculated according to the preferred embodiment of the present invention.

In this embodiment, using the defocus amount x=−5.2 mm to form the I-shaped TC4 alloy part by laser melting deposition, as shown in FIG. 6, the surface of the TC4 alloy part obtained is flat and smooth.

Figure 5:
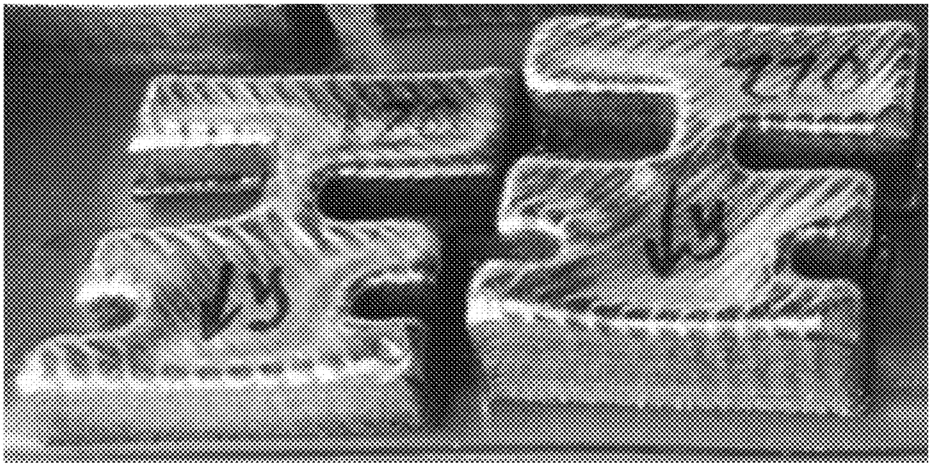
FIG. 5 is a schematic diagram of the surface of the I-shaped TC4 alloy part after forming by laser melting deposition, with the defocus amount $x=-2$ mm.

As a comparative example, a laser melting deposition forming experiment is performed on the same TC4 alloy part, with the defocus amount x=−2 mm and the other processing parameters are the same as those when the defocus amount x=−5.2 mm, that is the laser power is set to be 2800 W, the laser scanning speed is set to be 1000 mm/min, the spot diameter is set to be 5 mm, the powder feeding rate is set to be 28 g/min, the powder-carrying gas flow rate is set to be 8 L/min, and the lens-protecting gas flow rate is set to be 20 L/min. As shown in FIG. 5, depressions appear on the surface of the core of the TC4 alloy part obtained.

Although specific embodiments of the present invention are described above, those skilled in the art should understand that these are only examples, and various changes or modifications can be made to these embodiments without departing from the principles and essence of the present invention. Therefore, the scope of protection of the present invention shall be defined by the claims appended.

The invention claimed is:

1. A method for processing a part using a forming device by laser melting, comprising following steps:

S1, under condition that other process parameters of the forming device by laser melting are kept constant, performing single-pass experiments by setting different defocus amounts, and measuring a height of each single pass generated corresponding to different defocus amounts;

S2, taking the defocus amount as an independent variable and the height of the single pass as a dependent variable, establishing a function between the height of the single pass and the defocus amount, wherein the function is a polynomial function with a degree of at least four;

S3, performing first-order differentiation and second-order differentiation on the function to obtain a first-order derivative and a second-order derivative, solving the equation where the first-order derivative equals to zero to obtain different roots, substituting values of the different roots into the second-order derivative to obtain roots of the first-order derivative corresponding to values of the second-order derivative that is less than zero, among which value of a root with a smallest absolute value is defined as a first value;

S4, performing third-order differentiation on the function to obtain a third-order derivative, solving the equation where the second-order derivative equals to zero to obtain different roots, substituting values of the different roots into the third derivative to obtain roots of the second-order derivative corresponding to values of the third derivative that is less than zero, which is defined as second values;

S5, subtracting the first value from the second values, wherein the second value corresponding to a negative result with the smallest absolute value is a defocus amount value to be used;

S6, acquiring a focusing point of the forming device by laser melting, where the focusing point is a point where a laser beam emitted and powder ejected by a laser cladding head of the forming device by laser melting are converged, adjusting an initial distance between the focusing point and a substrate for forming the part such that the initial distance is equal to the defocus amount obtained in step S5 and the defocus amount is negative defocus;

S7, substituting the value of the defocus amount obtained in step S5 into the function in step S2 to obtain a corresponding height value of a single pass, and setting a relative displacement between the laser cladding head and the substrate for forming the part according to the height value of the single pass obtained, so as to keep a distance between the focusing point and an attaching deposition surface of the powder ejected by the laser cladding head unchanged.

2. The method as claimed in claim 1, wherein in step S1, the selection of the different defocus amount covers negative defocus, zero defocus and positive defocus.

3. The method as claimed in claim 1, wherein in step S1, the height of the single pass under the condition of different defocus amounts is measured by a metallographic method.

4. The method as claimed in claim 2, wherein in step S1, the height of the single pass under the condition of different defocus amounts is measure by metallographic method.

5. The method as claimed in claim 1, wherein in step S1, a temperature of the substrate in each single pass experiment is the same as that of the substrate in a previous single pass experiment.

6. The method as claimed in claim 1, wherein in step S1, at least 5 groups of the defocus amount are selected.

7. The method as claimed in claim 1, wherein in step S1, during single pass experiments at different defocus amounts, other process parameters such as a laser power, a laser scanning speed, a spot diameter, a powder feeding rate, a powder-carrying gas flow rate and a lens-protecting gas flow rate remain constant.

8. The method as claimed in claim 7, wherein in step S1, the laser power is 2800 W, the laser scanning speed is 1000 mm/min, the spot diameter is 5 mm, the powder feeding rate is 28 g/min, the powder-carrying gas flow rate is 8 L/min, and the lens-protecting gas flow rate is 20 L/min when carrying out the single pass experiments under the condition of different defocus amounts.

9. The method as claimed in claim 1, wherein in step S2, a functional relationship between the height of the single pass and the defocus amount is a quartic function.

10. The method as claimed in claim 1, wherein a correlation coefficient is not less than 0.995 during polynomial fitting.

* * * * *